UNITED STATES PATENT OFFICE.

Patented May 5, 1925.

1,537,020

ARTHUR WHITE YOUNG, OF KOKOMO, INDIANA, ASSIGNOR TO UDYLITE PROCESS COMPANY, OF KOKOMO, INDIANA, A CORPORATION OF INDIANA.

BRIGHTENING AGENT.

No Drawing.     Application filed June 12, 1924. Serial No. 719,664.

*To all whom it may concern:*

Be it known that I, ARTHUR WHITE YOUNG, a citizen of the United States, residing at Kokomo, in the county of Howard and State of Indiana, have invented certain new and useful Improvements in Brightening Agents, of which the following is a specification.

It has been found that in the electroplating of cadmium from cyanide solutions milk added to the plating bath in small quantities as an addition or brightening agent gives very satisfactory results. The milk may be used either in its raw form or in concentrated form, as in the commercial condensed and evaporated milks, that is, in any form in which the calcium caseinogenate content is in its original soluble form.

Either the sweetened so-called condensed milk or the unsweetened so-called evaporated milk may be used, but I prefer the unsweetened evaporated milk which, as is well known, is prepared ordinarily by evaporating raw milk under reduced pressure to about one-half its original volume and then subjecting it to sterilization in sealed cans.

Milk contains several materials, among which besides water are the butter fats, casein and milk sugar. I am unable to state whether the properties of milk as an addition agent are due to any one of the components of the milk or to their combined action. The fact that milk in which the calcium caseinogenate has not been precipitated gives results superior to those produced by the use of casein dissolved in alkali, would seem to indicate that the casein in its natural soluble form is the active agent, but it may be that the other components of the milk have a cooperative effect.

The quantity of milk used may vary over a very wide range, for instance, from 5 to 40 c. c. of unsweetened milk which has been concentrated to about one-half of its original volume per gallon of electrolyte. An average preferred addition is about 10 c. c. of the unsweetened concentrated milk per gallon of electrolyte.

The milk brightening agent may be used in any suitable cadmium cyanide plating bath, the composition of which may vary from say ¼ to 6 ounces of cadmium and from ¼ to 10 ounces of free sodium cyanide per gallon.

The following example illustrates the invention:

To a 50-gallon bath containing approximately 2 ounces of cadmium and 5 ounces of sodium cyanide per gallon there is added 400 c. c. of unsweetened half-volume concentrated milk and the bath is used for electroplating in the usual way.

Condensed milk may be used in substantially the same quantities as those stated for evaporated milk and raw milk may be used in approximately twice the quantities specified for evaporated milk.

I claim:—

1. Method of obtaining bright, dense, coherent deposits of cadmium upon another metal, which comprises electro-depositing cadmium from a solution thereof to which a relatively small amount of concentrated milk has been added.

2. Method as defined in claim 1 in which the solution of cadmium is a cyanide solution.

3. Method as defined in claim 1 in which the concentrated milk is unsweetened half-volume evaporated milk.

4. Method of obtaining bright, dense, coherent deposits of cadmium upon another metal, which comprises electro-depositing cadmium from a cyanide solution to which a relatively small amount of unsweetened half-volume evaporated milk has been added.

In testimony whereof, I affix my signature.

ARTHUR WHITE YOUNG.